(12) United States Patent
Shepherd

(10) Patent No.: US 12,725,533 B1
(45) Date of Patent: Sep. 1, 2026

(54) FORCIBLE ENTRY TRAINING DOOR ASSEMBLY

(71) Applicant: Forge Fire & Company, LLC, Perrysville, OH (US)

(72) Inventor: Todd Edward Shepherd, Perrysville, OH (US)

(73) Assignee: Forge Fire & Company, LLC, Bucyrus, OH (US)

( * ) Notice: Subject to any disclaimer, the term of this patent is extended or adjusted under 35 U.S.C. 154(b) by 1023 days.

(21) Appl. No.: 17/689,932

(22) Filed: Mar. 8, 2022

Related U.S. Application Data

(60) Provisional application No. 63/158,837, filed on Mar. 9, 2021.

(51) Int. Cl.
*G09B 19/00* (2006.01)
*A62C 99/00* (2010.01)

(52) U.S. Cl.
CPC .......... *G09B 19/00* (2013.01); *A62C 99/0081* (2013.01)

(58) Field of Classification Search
None
See application file for complete search history.

(56) References Cited

U.S. PATENT DOCUMENTS 11,414,915 B1* 8/2022 Cummings ............ G09B 19/00
2002/0157294 A1* 10/2002 Stanley ..................... G09F 7/04 40/600
2011/0247274 A1* 10/2011 Clewis ..................... A62B 5/00 49/382
2012/0156663 A1* 6/2012 Troxell .................. G09B 19/00 434/219
2015/0037767 A1* 2/2015 Britton ................... G09B 19/24 434/226
2017/0370113 A1* 12/2017 Nyce .................. E04B 1/34807
2018/0333600 A1* 11/2018 Pristach ................ E05C 19/003

FOREIGN PATENT DOCUMENTS

GB 2533977 A * 7/2016 ............. A63B 71/02

OTHER PUBLICATIONS

YouTube, "The Challenger Forcible Entry Training Door System. m4v", showing a forcible entry training door by PEB Enterprises, accessed at: https://www.youtube.com/watch?v=ktjOvVXjRxU (published on YouTube by Brad Burgess on Feb. 22, 2013) (Year: 2013).*

(Continued)

*Primary Examiner* — James B Hull
(74) *Attorney, Agent, or Firm* — The Law Office of Patrick F. O'Reilly III, LLC

(57) ABSTRACT

A forcible entry training door assembly is disclosed herein. The forcible entry training door assembly includes a door frame; and a door pivotally coupled to the door frame, the door including a plurality of pockets formed therein for removably receiving respective sacrificial crush blocks, each of the sacrificial crush blocks configured to be crushed by a user during a forcible entry training exercise and subsequently replaced with undeformed sacrificial crush blocks for use during a subsequent forcible entry training exercise.

18 Claims, 15 Drawing Sheets

(56) References Cited

OTHER PUBLICATIONS

"Fire Force Inc.—Home", Fire Force Inc. Website, Web page <http://www.fireforceinc.com/>, 2 pages, dated at least as early as Aug. 26, 2019, retrieved from Internet Archive Wayback Machine <https://web.archive.org/web/20190826105650/http://www.fireforceinc.com/> on Sep. 4, 2024.

"Forcible Entry Simulators—Fire Force Inc.", Fire Force Inc. Website, Web page <https://web.archive.org/web/20170904064912/http://www.fireforceinc.com/forcible-entry-simulators1.html>, 5 pages, dated at least as early as Sep. 4, 2017, retrieved from Internet Archive Wayback Machine <https://web.archive.org/web/20170904064912/http://www.fireforceinc.com/forcible-entry-simulators1.html> on Sep. 4, 2024.

* cited by examiner

FORCIBLE ENTRY TRAINING DOOR ASSEMBLY

CROSS-REFERENCE TO RELATED APPLICATIONS

This patent application claims priority to, and incorporates by reference in its entirety, U.S. Provisional Patent Application No. 63/158,837, entitled "Forcible Entry Training Door Assembly", filed on Mar. 9, 2021.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a forcible entry training door assembly. More particularly, the invention relates to a forcible entry training door assembly that is used for forcible entry training of first responders.

2. Background

Conventional forcible entry training devices present many shortcomings for the first responder industry. As examples of these shortcomings, conventional forcible entry training devices do not provide a reusable door that flexes, nor do these conventional devices provide crush zones for practicing a gap/set/force technique with regard to forcible entry training methodology. As another example, conventional forcible entry training devices are very limited in the options that they offer to the end user, and thus, these devices are not readily adaptable to different training exercises. As yet another example of these shortcomings, none of these conventional devices provide a comprehensive forcible entry training system that covers a multitude of basic through advanced training tactics. As still another example of these shortcomings, many conventional forcible entry training devices are not readily portable, thereby making it difficult to transport the devices from one location to another location.

Therefore, what is needed is a forcible entry training door assembly that provides sacrificial crush zones and a reusable door that is able to flex, rather than permanently deform. Moreover, a forcible entry training door assembly is needed that offers many different options to the end user so as to be readily adaptable for use in a myriad of different training exercises. Furthermore, what is needed is a forcible entry training door assembly that is readily portable so as to allow the door assembly to be easily transported from one location to another location.

BRIEF SUMMARY OF EMBODIMENTS OF THE INVENTION

Accordingly, the present invention is directed to a forcible entry training door assembly that substantially obviates one or more problems resulting from the limitations and deficiencies of the related art.

In accordance with one or more embodiments of the present invention, there is provided a forcible entry training door assembly that includes a door frame; and a door pivotally coupled to the door frame, the door including a plurality of pockets formed therein for removably receiving respective sacrificial crush blocks, each of the sacrificial crush blocks configured to be crushed by a user during a forcible entry training exercise and subsequently replaced with undeformed sacrificial crush blocks for use during a subsequent forcible entry training exercise.

In a further embodiment of the present invention, the plurality of pockets for removably receiving the respective sacrificial crush blocks comprise a lower pocket below a securement member of the door for receiving a lower sacrificial crush block, and an upper pocket above the securement member of the door for receiving an upper sacrificial crush block.

In yet a further embodiment, the door is formed from a material that is configured to flex and bend to simulate a deformation of an actual door while a forcible entry training exercise is being performed on the door.

In still a further embodiment, the material forming the door comprises steel.

In yet a further embodiment, the door frame comprises a plurality of modular elements that are bolted together so as to form the overall door frame, thereby enabling portions of the door frame to be repaired if damaged during a forcible entry training exercise.

In still a further embodiment, the door further comprises at least one centrally located cutout for accommodating a mounting of a sacrificial plate adjacent to the at least one centrally located cutout, the at least one centrally located cutout enabling the sacrificial plate to be cut during a forcible entry training exercise without damaging the door.

In yet a further embodiment, the forcible entry training door assembly further comprises a drop bar subassembly mounted on an inswing side of the door, the drop bar subassembly enabling the user to simulate a forcible entry through an inswing door secured by a drop bar mounted across the inswing door.

In still a further embodiment, the forcible entry training door assembly further comprises a panic bar subassembly mounted to a central region of the door, the panic bar subassembly enabling the user to simulate a forcible entry through an actual door secured by a panic bar, and the panic bar subassembly being magnetically attached to the central region of the door so that the panic bar subassembly is able to be selectively attached and detached from the door during particular forcible entry training exercises without the use of tools.

In yet a further embodiment, the forcible entry training door further comprises at least one wheel lift subassembly that includes a bracket member, a trailer jack, and a plurality of wheels, the at least one wheel lift subassembly removably attached to the door frame by the bracket member, the at least one wheel lift subassembly configured to facilitate a transporting of the forcible entry training door assembly by enabling the forcible entry training door assembly to be rolled from one location to another location by using the plurality of wheels, and the trailer jack of the at least one wheel lift subassembly enabling the plurality of wheels to be elevated above a support surface so that the forcible entry training door assembly is able to be immovably supported on the support surface while a forcible entry training exercise is being performed by the user.

In still a further embodiment, the bracket member of the at least one wheel lift subassembly is configured to be removably attached to the door frame without the use of pins or tools.

In yet a further embodiment, the door frame comprises at least one reinforcing bar support subassembly, the at least one reinforcing bar support subassembly comprising an aperture disposed through the door frame for receiving a piece of reinforcing bar, and the at least one reinforcing bar support subassembly further comprising a fastener member for securing the piece of reinforcing bar within the aperture while the piece of reinforcing bar is being cut by the user during a forcible entry training exercise.

In still a further embodiment, the door with the plurality of pockets formed therein is a primary door; and the forcible entry training door assembly further comprises a plurality of auxiliary door hinges or brackets mounted to the door frame, the plurality of auxiliary door hinges or brackets configured to be used for attaching an auxiliary sacrificial door to the forcible entry training door assembly so that the auxiliary sacrificial door is able to be cut or otherwise damaged during one or more forcible entry training exercises without damaging the primary door of the forcible entry training door assembly.

In yet a further embodiment, the door further comprises at least one door lock aperture disposed through the door for accommodating a mounting of a deadbolt lock on the door so that the deadbolt lock is able to be breached during a forcible entry training exercise.

In still a further embodiment, the door frame comprises at least one pocket formed therein for removably receiving a sacrificial frame crush block, the sacrificial frame crush block configured to be crushed by the user during a baseball swing forcible entry training exercise and subsequently replaced with an undeformed sacrificial frame crush block.

In yet a further embodiment, the forcible entry training door assembly further comprises an anchor bracket mounted on a side of the door frame, the anchor bracket configured to accommodate a mounting of a padlock and/or a chain on the door frame so that padlock and/or chain breaching is able to be practiced by the user during a forcible entry training exercise.

In still a further embodiment, the forcible entry training door assembly further comprises a lock holder bracket mounted on a side of the door frame, the lock holder bracket configured to accommodate a mounting of a residential deadbolt lock or a commercial lock on the door frame so that a breaching of the residential deadbolt lock or the commercial lock is able to be practiced by the user during a forcible entry training exercise.

In yet a further embodiment, the door further comprises at least one centrally located reinforced area for accommodating a ramming of the door by a battering ram swung by the user during a forcible entry training exercise.

In still a further embodiment, the door with the plurality of pockets formed therein is a primary door; and the forcible entry training door assembly further comprises an auxiliary door mounted to the door frame by means of auxiliary door hinges, the auxiliary door configured to be used as a sacrificial door during one or more forcible entry training exercises so that the auxiliary sacrificial door is able to be cut or otherwise damaged without damaging the primary door of the forcible entry training door assembly.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 1:
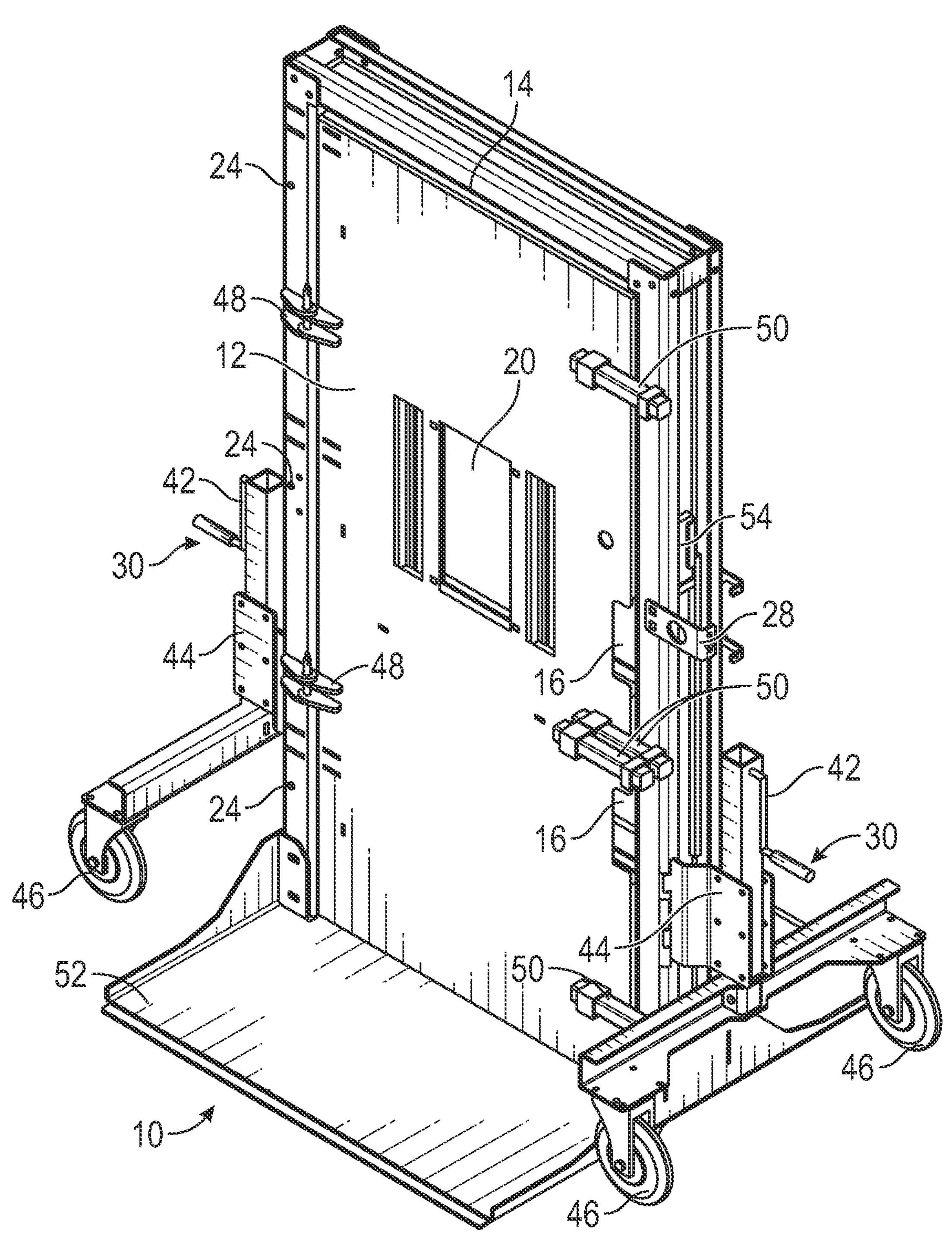
FIG. 1 is a front-side perspective view of a forcible entry training door assembly, according to an illustrative embodiment of the invention.
Figure 2:
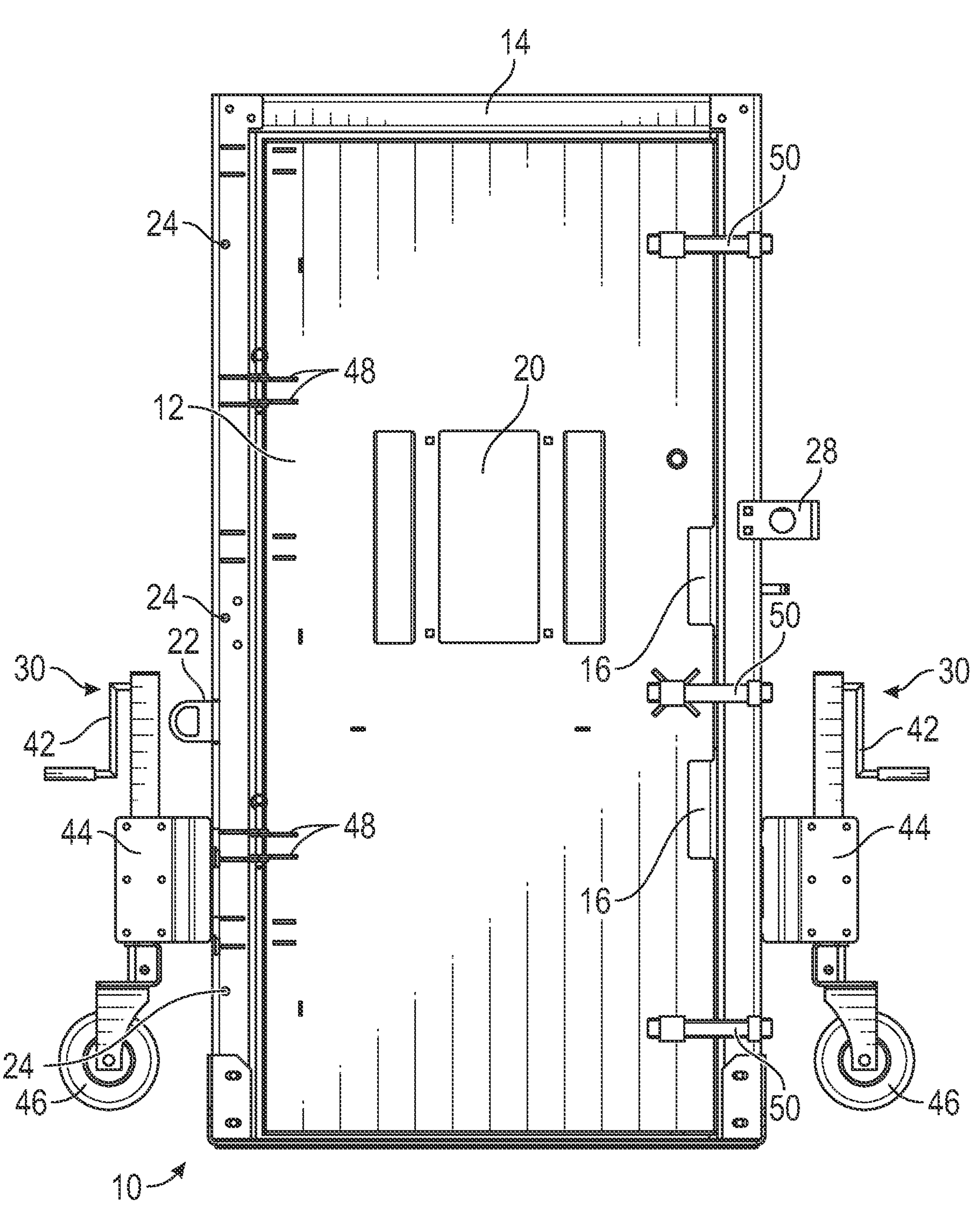
FIG. 2 is a front view of the forcible entry training door assembly of FIG. 1.
Figure 3:
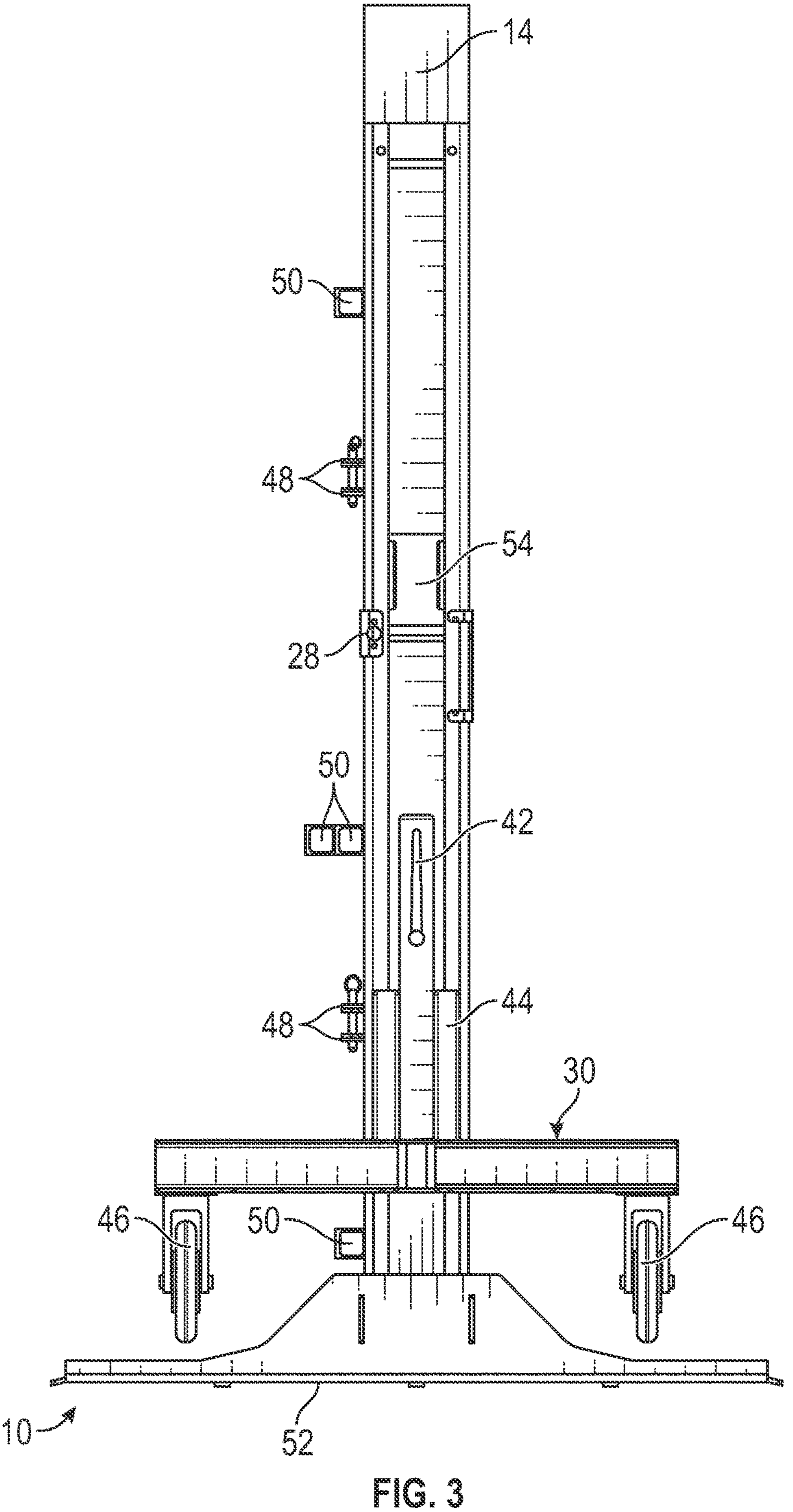
FIG. 3 is a side view of the forcible entry training door assembly of FIG. 1.
Figure 4:
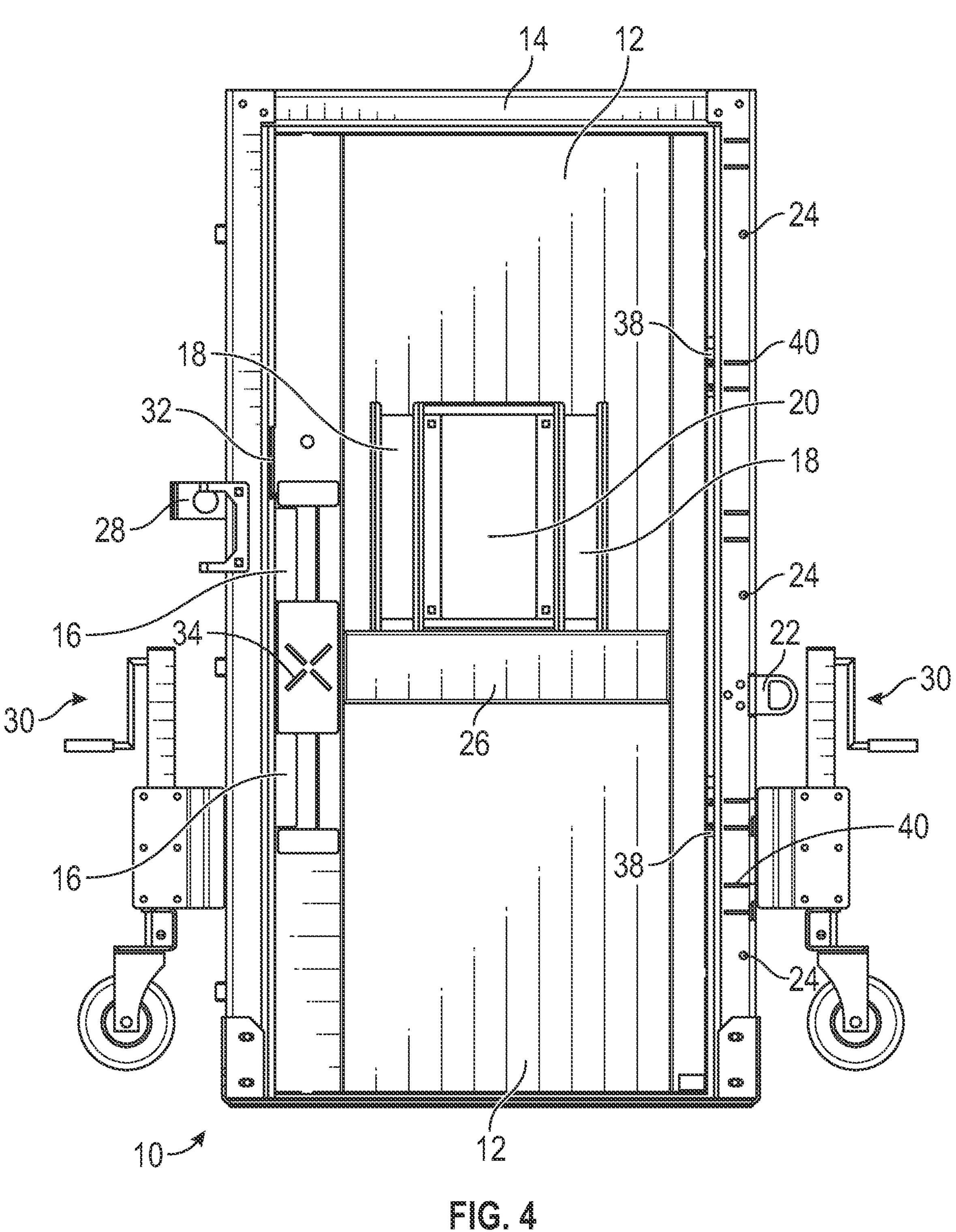
FIG. 4 is a rear view of the forcible entry training door assembly of FIG. 1.
Figure 5:
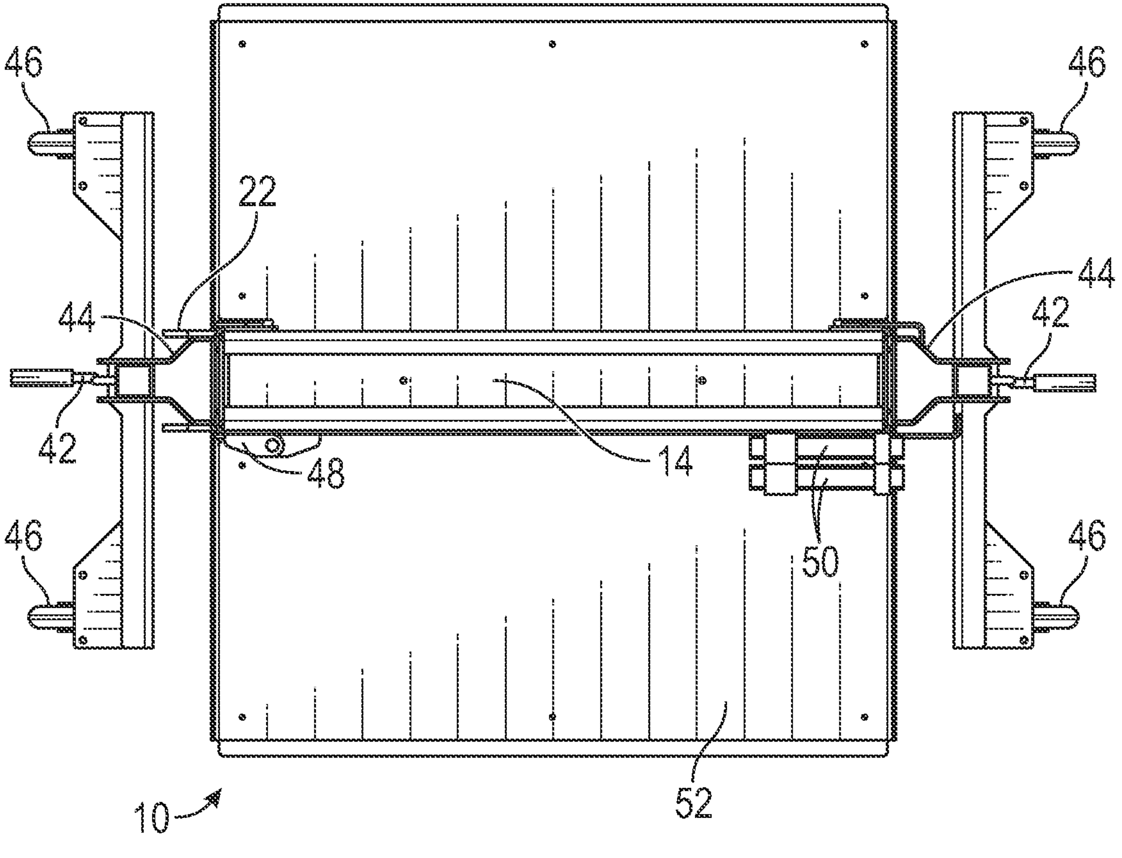
FIG. 5 is a top plan view of the forcible entry training door assembly of FIG. 1.

An illustrative embodiment of a forcible entry training door assembly is seen generally at 10 in FIGS. 1-5, 7-9, 12, and 13. With particular reference to FIGS. 1, 2, and 4, in the illustrative embodiment, the forcible entry training door assembly 10 generally comprises a door frame 14, a door 12 pivotally coupled to the door frame 14, the door 12 including a plurality of pockets formed therein for removably receiving respective sacrificial crush blocks 16, each of the sacrificial crush blocks 16 configured to be crushed by a user during a forcible entry training exercise and subsequently replaced with undeformed sacrificial crush blocks for use during a subsequent forcible entry training exercise.

In the illustrative embodiment, with reference to FIGS. 1, 2, 4, 9, and 15, the plurality of pockets in the door 12 for removably receiving the respective sacrificial crush blocks 16 comprise a lower pocket below a securement member (e.g., below sacrificial securement member(s) 50) of the door 12 for receiving a lower sacrificial crush block 16, and an upper pocket above the securement member (e.g., above sacrificial securement member(s) 50) of the door for receiving an upper sacrificial crush block 16.

Advantageously, in the illustrative embodiment, the forcible entry training door assembly 10 includes dynamic and economic sacrificial crush areas at crucial set/forcing points. The interchangeable crush blocks 16 are able to realistically duplicate multiple types of door construction ranging from wood residential to heavy steel commercial applications. As an example, the crush blocks 16 may be made from 2"×4" wood blocks and a 20 gauge or 24 gauge steel sleeve. The wood 2×4 is used for wood doors and the steel sleeves are added over the 2×4 blocks for simulating steel doors. This configuration simulates realistic crush in the common areas where forcible entry pry tools will be inserted between the door and jamb. The door assembly 10 can also easily adjust the tightness of the jamb for more advanced and technical tactics. The dynamic design helps eliminate bad habits, increases efficiency/effectiveness by using built-in redundancies that enforces the correct forcible entry techniques.

Referring again to the illustrative embodiment of FIG. 4, centrally located steel tracks 18 in the door 12 allow crush blocks to be added to the center of the door 12 for a sacrificial section to mount drop bar brackets. Drop bar brackets allow a wood 2×4 or a steel bar to be added to the back of the door frame 14. These steel bars are commonly called “burglar bars”.

Also, in the illustrative embodiment, referring to FIGS. 1, 3, 14, and 17, the door frame 14 comprises a pocket formed therein for removably receiving a sacrificial frame crush block 54. The sacrificial frame crush block 54 is configured to be crushed by the user during a baseball swing forcible entry training exercise and subsequently replaced with an undeformed sacrificial frame crush block. A door jamb window 32 on the inside surface of the door frame 14 (see FIG. 4) allows access to the pocket in the door frame 14. In the illustrative embodiment, the sacrificial frame crush block 54 may comprise a no-drill, no-fastener, wood jamb insert that is deformed during a baseball swing forcible entry training exercise, which typically involves swinging a Halligan tool in a baseball bat fashion to drive the sharp portion of the tool into the gap between the door and the frame, and then prying the door open. Advantageously, the no-drill, no-fastener, wood jamb insert does not require the user to perform any drilling or fastener operations. In one application, the door jamb window 32 and steel track of the pocket allows plywood to be mounted inside the door frame 14 to create a residential wood frame. No bolting or screws are needed for mounting the plywood in the pocket of the door frame 14.

With reference to FIG. 1, in the illustrative embodiment, the door 12 is pivotally coupled to the door frame 14 by means of hinges 48. Each of the hinges 48 may include a removable cotter pin for allowing the door to be completely removed from the door frame 14. Also, in the illustrative embodiment, the door 12 may be secured in a closed position by a plurality of sacrificial securement members 50 (e.g., formed from elongate wood blocks). The sacrificial securement members 50 are designed to be severed by the user during a forcible entry training exercise performed on the door 12. Also, with combined reference to FIGS. 1, 3, and 5, it can be seen that the forcible entry training door assembly 10 may be provided with an assembly base 52 disposed thereunder to stabilize the assembly 10 (e.g., after the wheels 46 of each wheel lift subassembly 30 have been elevated above the support surface, which will be described in further detail hereinafter).

As best shown in FIGS. 1, 2, and 4, in the illustrative embodiment, the door frame 14 comprises a plurality of modular elements that are bolted together so as to form the overall door frame 14, thereby enabling portions of the door frame 14 to be repaired if damaged during a forcible entry training exercise. Advantageously, the modular construction of the forcible entry training door assembly 10 enables the door assembly 10 to be repaired if necessary, thereby allowing the door assembly 10 to be used for many years of training. As an example, the door frame 14 may be laser cut from ¼" thick steel sheet, and then formed into a C-channel. In this example, the illustrative door frame 14 may have a width of approximately 40 inches and a height of approximately 84 inches.

Also, in the illustrative embodiment, with reference to FIGS. 1, 2, 4, 10, 13, and 18, the door frame 14 includes a plurality of reinforcing bar support subassemblies (e.g., three (3) reinforcing bar support subassemblies). Referring to FIGS. 1, 2, 10, and 13, it can be seen that each reinforcing bar support subassembly comprises an aperture 24 disposed through the door frame 14 for receiving a piece of reinforcing bar 66, and each reinforcing bar support subassembly further comprises a fastener member 68 (e.g., a rebar tensioning bolt with a handle) for securing the piece of reinforcing bar 66 within the aperture 24 while the piece of reinforcing bar 66 is being cut by the user during a forcible entry training exercise. In the illustrative embodiment, the plurality of reinforcing bar support subassemblies form a rebar cutting tree that provides low, middle, and high cutting built into the side frame 14 of the door assembly 10. When using the reinforcing bar support subassemblies (i.e., the reinforcing bar cutting stations), the user slides the piece of reinforcing bar 66 through one of the apertures 24, and then tightens the handle of the tension bolt 68 for securing the piece of reinforcing bar 66 in place.

Turning to FIGS. 2, 4, and 8-10, in the illustrative embodiment, the forcible entry training door assembly 10 further comprises an anchor bracket 22 mounted on a side of the door frame 14. The anchor bracket 22 is configured to accommodate a mounting of a padlock 74 (see FIG. 10) and/or a chain on the door frame 14 so that padlock 74 and/or chain breaching is able to be practiced by the user during a forcible entry training exercise. In the illustrative embodiment, the anchor bracket 22 may be formed from AR400 steel, and may be bolted on the door frame 14.

Also, with reference to FIGS. 1-4, in the illustrative embodiment, the forcible entry training door assembly 10 further comprises a lock holder bracket 28 mounted on a side of the door frame 14. The lock holder bracket 28 is configured to accommodate a mounting of a residential deadbolt lock or a commercial lock (e.g., an Adams Rite lock) on the door frame 14 so that a breaching of the residential deadbolt lock or the commercial lock is able to be practiced by the user during a forcible entry training exercise. In the illustrative embodiment, the lock holder bracket 28 may be formed from AR400 steel.

In the illustrative embodiment, the door 12 is formed from a material that is configured to flex and bend to simulate a deformation of an actual door while a forcible entry training exercise is being performed on the door 12 (see FIGS. 1, 2, 4, and 12). In the illustrative embodiment, the material forming the door comprises heavy duty steel, which is engineered to flex in generally the same manner as a real door. As an example, the door 12 may be laser cut from ⅛ " thick steel sheets. In this example, the illustrative door 12 may have a width of approximately 36 inches, a height of approximately 80 inches, and a thickness of approximately 1¾ inches. The user can utilize one or all of the multiple low, middle or high locking points to duplicate a realistic gap/set/force technique, all while focusing on managing capture of progress. Advantageously, the door assembly 10 may be used for a wide variety of firefighting and law enforcement forcible entry training activities.

Figure 6:
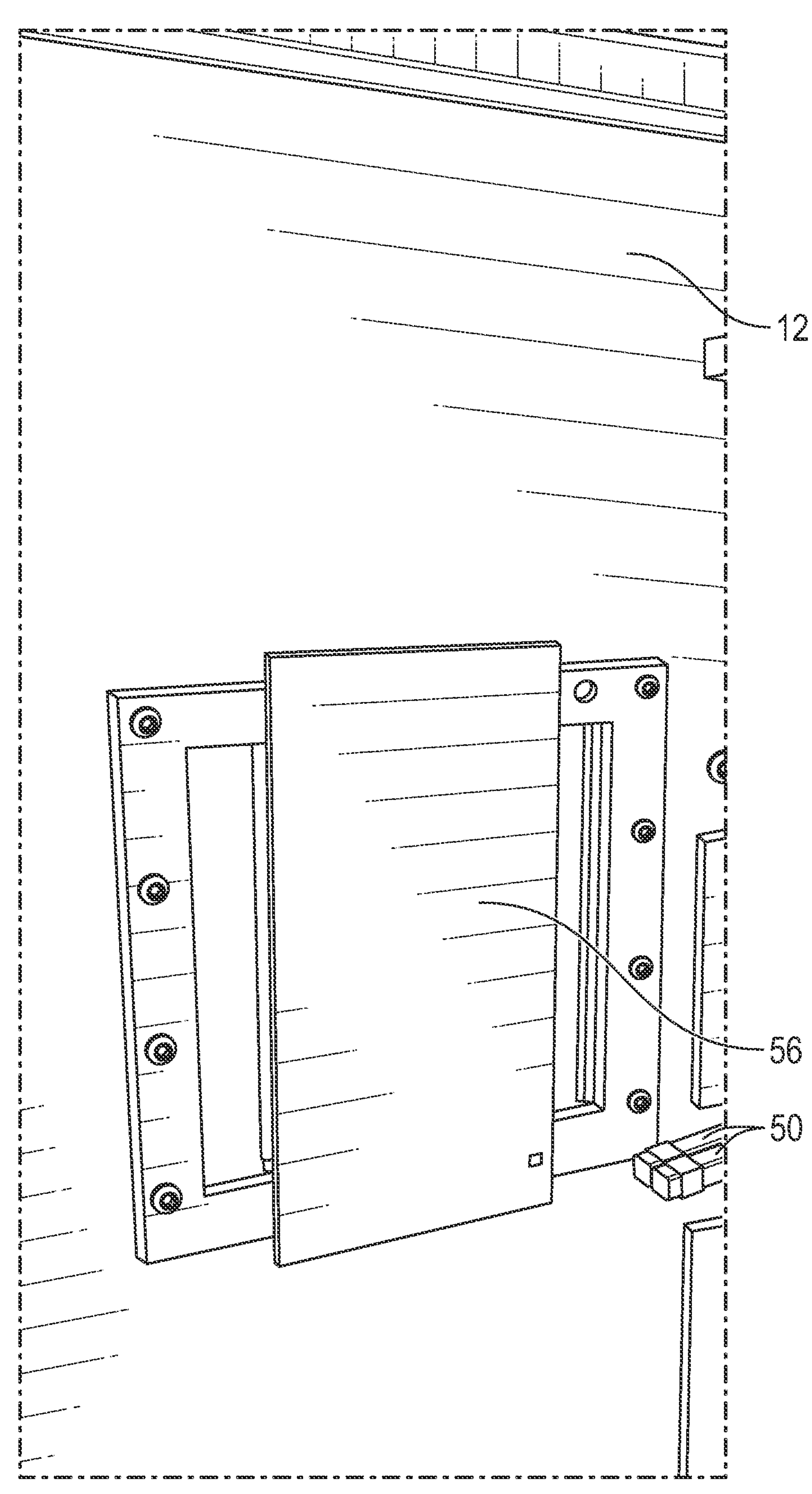
FIG. 6 is an enlarged front perspective view of a sacrificial plate mounted over the centrally located cutout in the door of the forcible entry training door assembly of FIG. 7.
Figure 13:
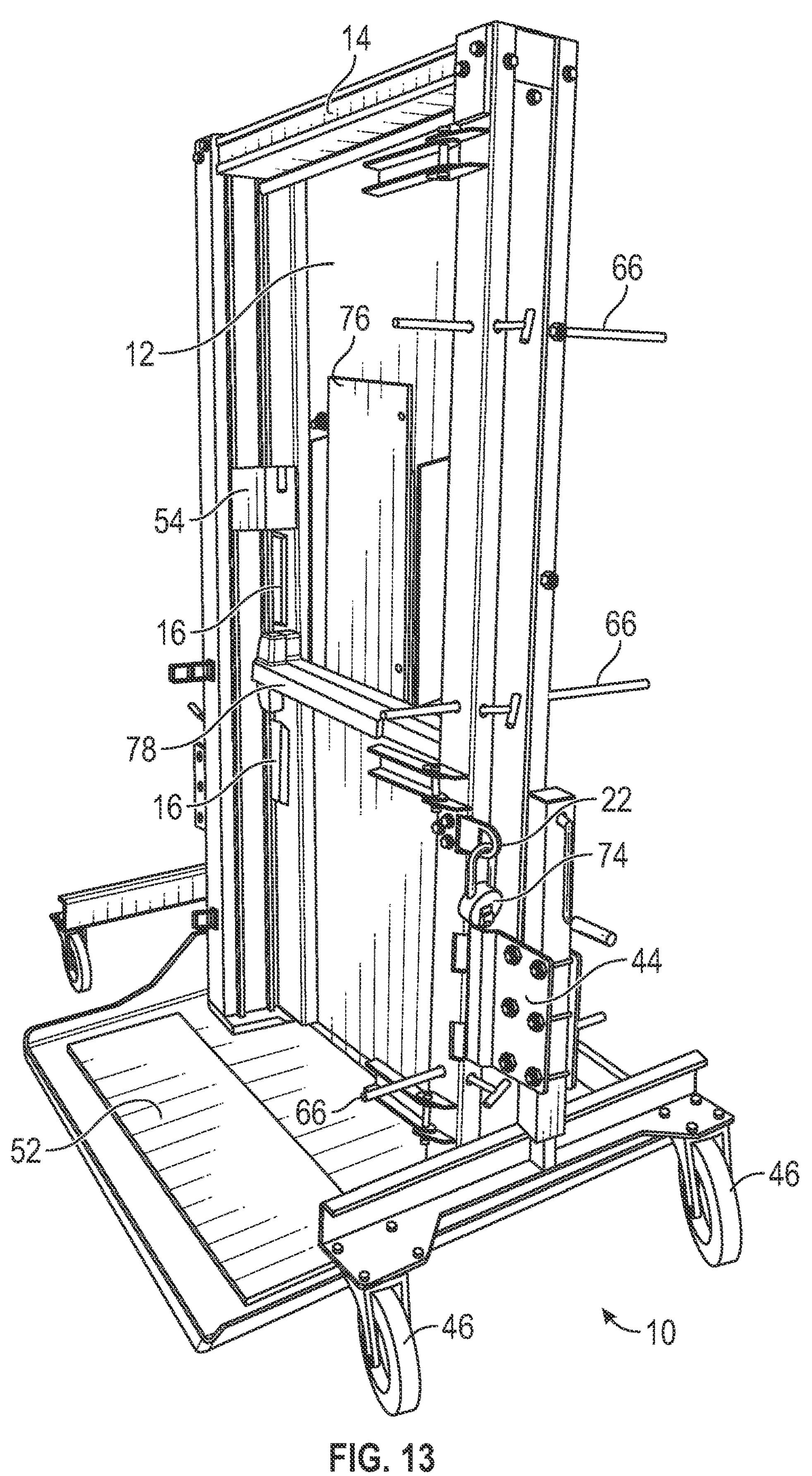
FIG. 13 is another rear perspective view of the forcible entry training door assembly of FIG. 7, wherein additional features of the primary door and door frame are illustrated.
Figure 15:
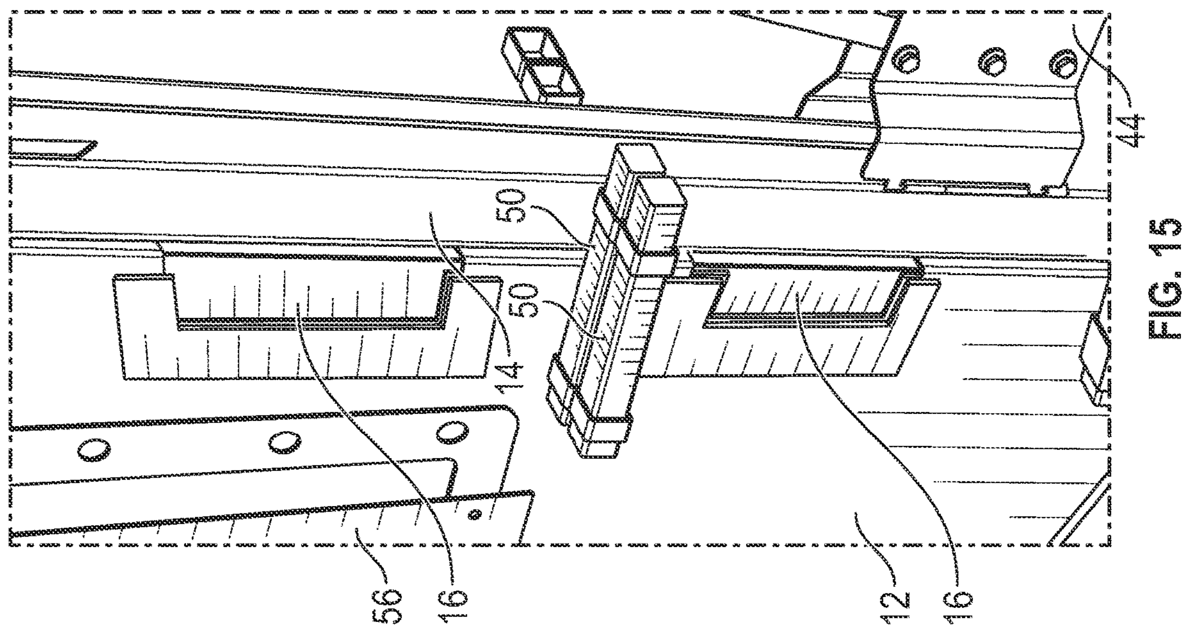
FIG. 15 is yet another enlarged front perspective view of the forcible entry training door assembly of FIG. 7, wherein upper and lower crush blocks mounted in the door are illustrated together with one of the sacrificial securement blocks of the primary door and the bracket member of one of the wheel lift subassemblies.
Figure 19:
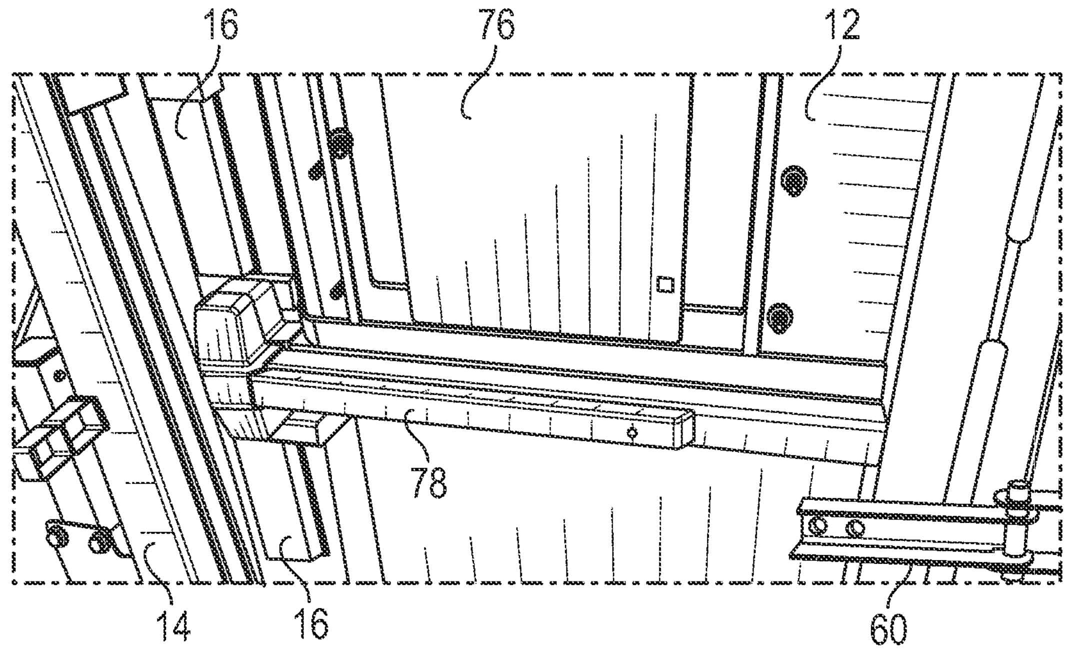
FIG. 19 is yet another enlarged rear perspective view of the forcible entry training door assembly of FIG. 7, wherein a magnetically attached panic bar subassembly is illustrated together with upper and lower crush blocks mounted in the primary door and a sacrificial plate mounted over the centrally located cutout in the door.

With combined reference to FIGS. 1, 2, 4, and 6, in the illustrative embodiment, the door 12 further comprises a centrally located cutout 20 for accommodating a mounting of a sacrificial plate 56 (see FIG. 6) adjacent to the centrally located cutout 20. The centrally located cutout 20 enables the sacrificial plate 56 to be cut during a forcible entry training exercise without damaging the door 12. As shown in FIG. 6, the sacrificial plate 56 is mounted on the front side of the door 12. As shown in FIGS. 13 and 19, a sacrificial plate 76 may also be mounted on the rear side of the door 12. In the illustrative embodiment, the centrally located window cutout 20 enables 20-gauge sheet steel (e.g., plates 56, 76) to be added via front and back tracks. This mounting arrangement makes a sacrificial center of the door 12 for the purpose of cutting through the door 12 for various entry tactics utilizing panic bars.

Figure 14:
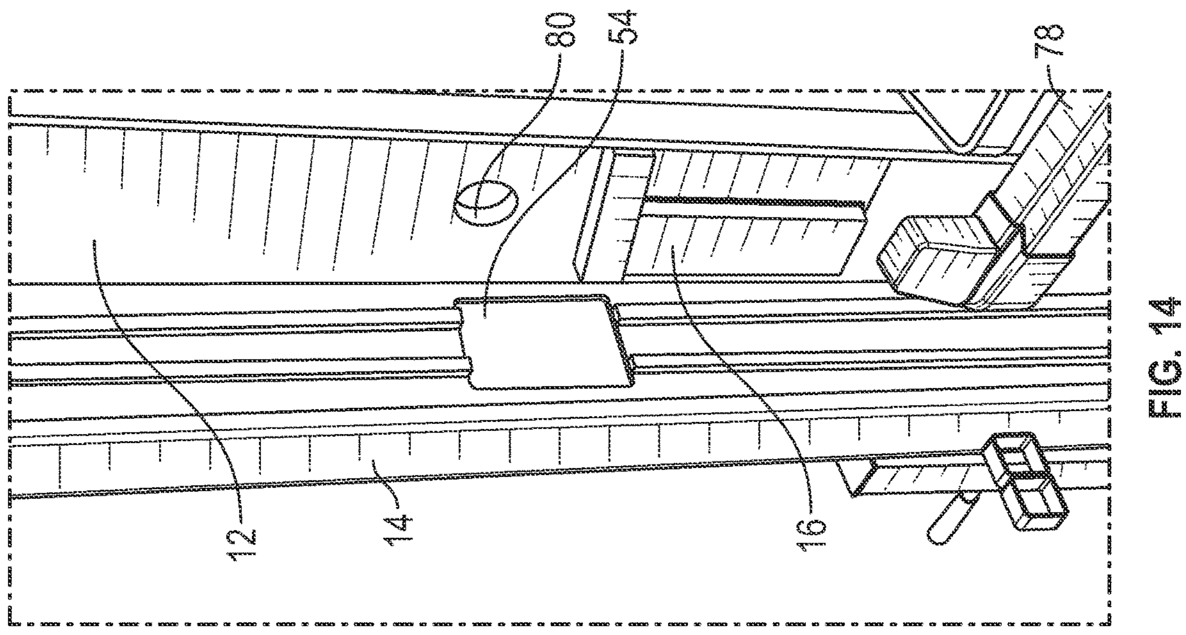
FIG. 14 is an enlarged rear perspective view of the forcible entry training door assembly of FIG. 7, wherein a sacrificial crush block mounted in the door frame is illustrated together with a magnetically attached panic bar subassembly.
Figure 17:
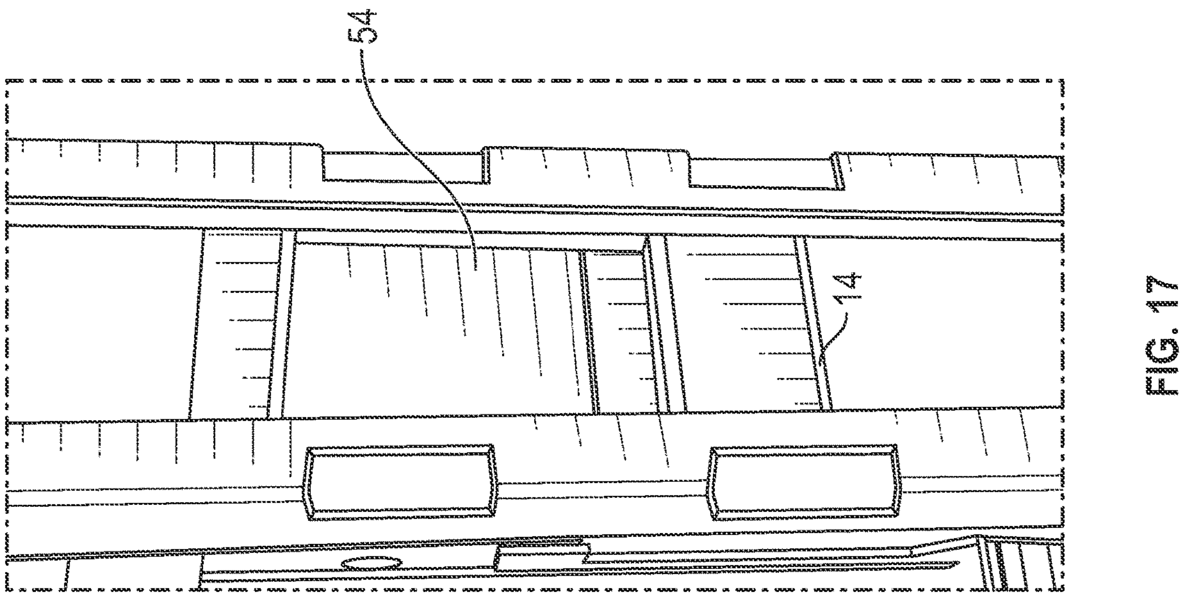
FIG. 17 is an enlarged side perspective view of the forcible entry training door assembly of FIG. 7, wherein a sacrificial crush block mounted in the door frame is illustrated.
Figure 16:
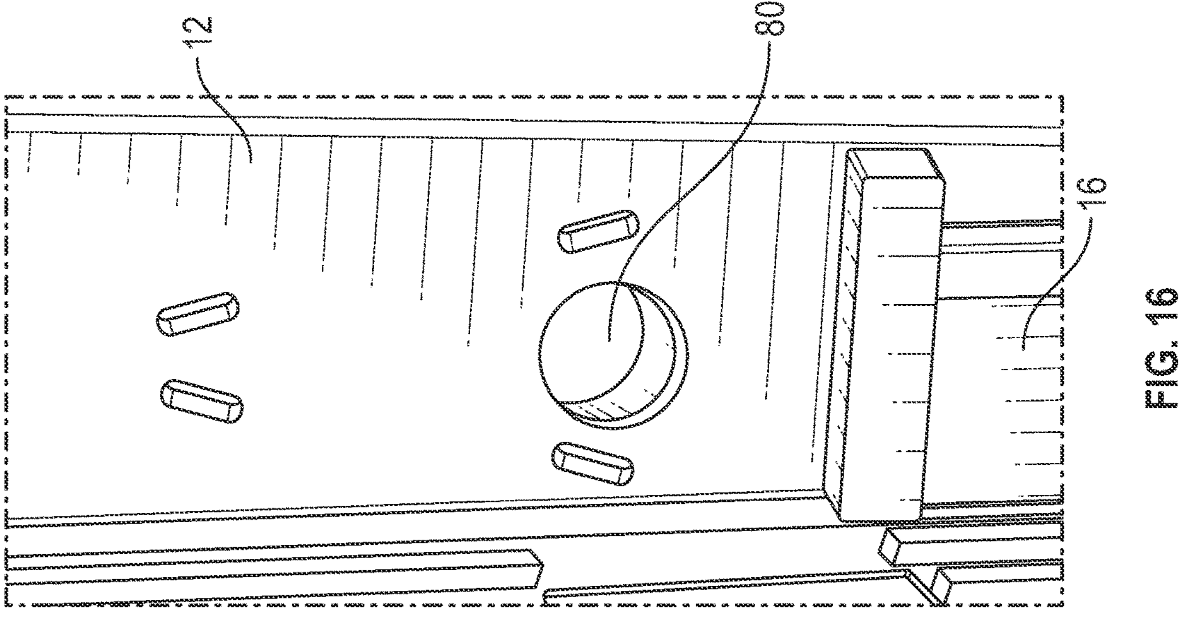
FIG. 16 is another enlarged rear perspective view of the forcible entry training door assembly of FIG. 7, wherein a door lock aperture disposed through the door is illustrated.

In the illustrative embodiment, as shown in FIGS. 14 and 16, the door 12 further comprises a door lock aperture 80 disposed through the door 12 for accommodating a mounting of a deadbolt lock in an anatomically correct location on the door 12 so that the deadbolt lock is able to be breached during a forcible entry training exercise.

Advantageously, the illustrative forcible entry training door assembly 10 includes a thru-the-lock (TTL) system. This TTL system provides the ability to pull real locks as well as a reusable deadbolt lock provided with the door assembly 10. The locks are anatomically placed on the door 12 for realistic applications. Also, the illustrative forcible entry training door assembly 10 includes real commercial Adams Rite locks and residential deadbolt locks in the TTL system for dynamic and efficient training.

Turning to FIG. 4, in the illustrative embodiment, the door 12 further comprises a centrally located reinforced area 34 for accommodating a ramming of the door 12 by a battering ram swung by the user during a forcible entry training exercise. For example, the centrally located reinforced area 34 of the door 12 may comprise a reinforced steel pad for absorbing the impact of a police battering ram without damage being sustained to the door 12.

Figure 12:
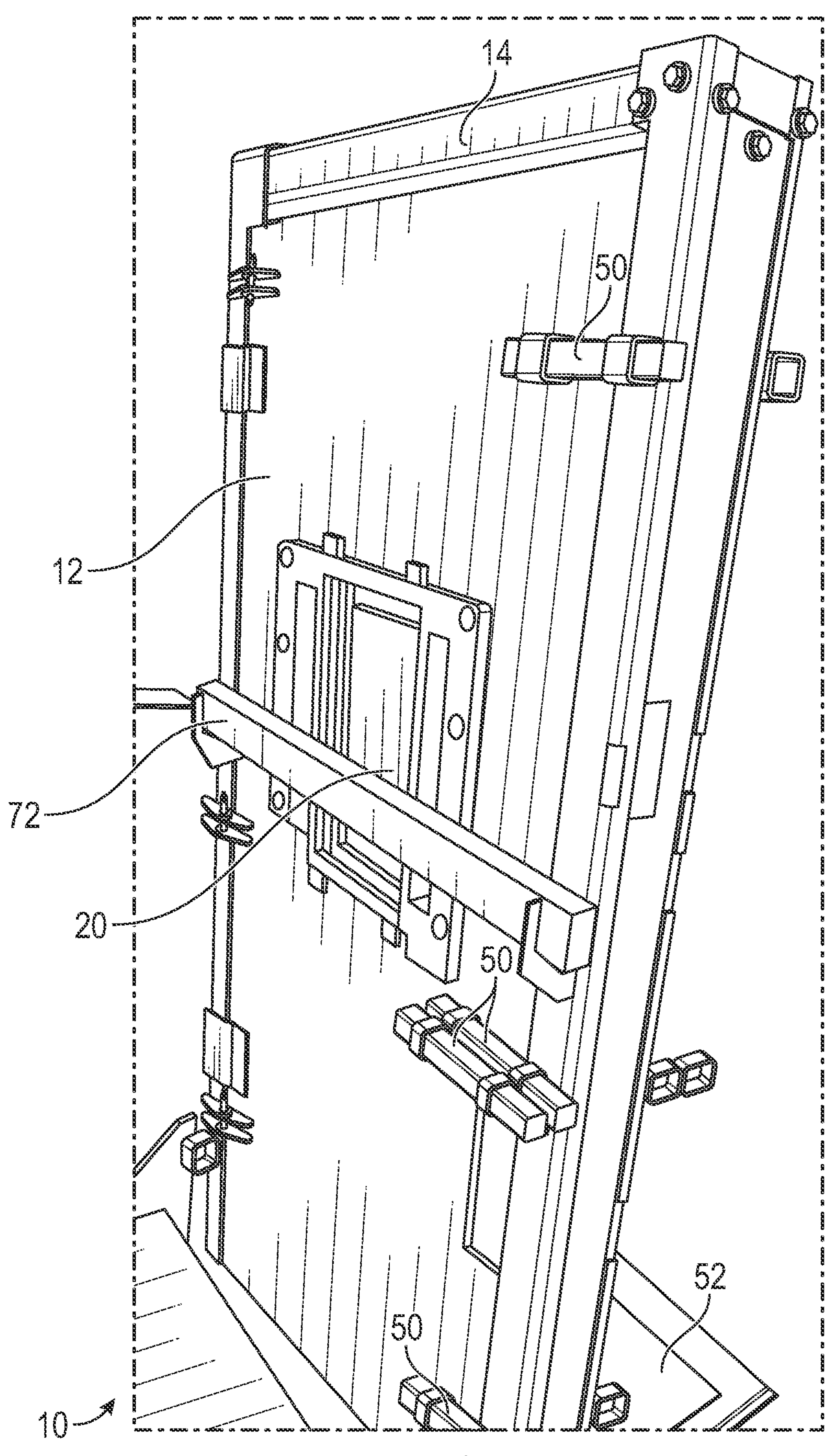
FIG. 12 is another front perspective view of the forcible entry training door assembly of FIG. 7, wherein a drop bar subassembly mounted on an inswing side of the primary door is illustrated.

As shown in FIG. 12, in the illustrative embodiment, the forcible entry training door assembly 10 further comprises a drop bar subassembly 72 mounted on an inswing side of the door 12. The drop bar subassembly 72 enables the user to simulate a forcible entry through an inswing door secured by a drop bar mounted across the inswing door (e.g., a drug dealer may secure a door from the inside using a 2×4 piece of wood across the door, which is known as a drug dealer bar). The drop bar subassembly 72 simulates this type of bar across the door so that a first responder can practice breaching the secured door during a forcible entry training exercise.

Also, as shown in FIGS. 13, 14, and 19, in the illustrative embodiment, the forcible entry training door assembly 10 further comprises a panic bar subassembly 78 mounted to a central region of the door 12. The panic bar subassembly 78 enables the user to simulate a forcible entry through an actual door secured by a panic bar. Advantageously, in the illustrative embodiment, the panic bar subassembly 78 is magnetically attached to the magnetic panic bar mount 26 in the central region of the door 12 (see FIG. 4) by a plurality of heavy duty magnets so that the panic bar subassembly 78 is able to be selectively attached and detached from the door during particular forcible entry training exercises without the use of fasteners or tools (i.e., no bolts or screws are needed for the attachment of the panic bar subassembly 78).

Turning to FIGS. 1-5, 13, and 15, in the illustrative embodiment, the forcible entry training door assembly 10 further comprises a pair of wheel lift subassemblies 30 disposed on opposite sides of the door 12. As best shown in FIGS. 1-5, each of the wheel lift subassemblies 30 comprises a bracket member 44, a trailer jack 42 with a crank, and a plurality of wheels 46 (e.g., a pair of wheels 46). In the illustrative embodiment, each of the wheel lift subassemblies 30 are removably attached to the door frame 14 by the respective bracket members 44. Advantageously, the wheel lift subassemblies 30 are configured to facilitate a transporting of the forcible entry training door assembly 10 by enabling the forcible entry training door assembly 10 to be rolled from one location to another location by using the plurality of wheels 46, thereby obviating the need for lifting the heavy forcible entry training door assembly 10. The trailer jack 42 of each wheel lift subassembly 30 enables the plurality of wheels 46 to be elevated above a support surface (e.g., a floor) so that the forcible entry training door assembly 10 is able to be immovably supported on the support surface while a forcible entry training exercise is being performed by the user. Rotating the handle of each trailer jack 42 in a first rotational direction (e.g., clockwise) lifts the door 12 for transport, while rotating the handle of each trailer jack 42 in a second, opposite rotational direction (e.g., counterclockwise) lowers the door 12 for use in training (each trailer jack 42 is operatively coupled to one pair of wheels 46). In the illustrative embodiment, the bracket member 44 of each wheel lift subassembly 30 is configured to be removably attached to the door frame 14 without the use of pins or tools. Advantageously, the easy on/off wheel lift subassemblies 30 make it easy for a single person to move the approximately 1,000 lb. door assembly 10 anywhere on flat surfaces. Also, loading the door assembly 10 onto a trailer is easily managed by just two people. The unique portability of the forcible entry training door assembly 10 makes it more efficient and more apt to be used for training.

In the illustrative embodiment, each bracket member 44 of the wheel lift subassemblies 30 may be laser cut from ¼ " thick steel sheet, and then formed into the bracket configuration. Each bracket member 44 is provided with hooks thereon for engaging with respective slots in the door frame 14, thereby obviating the need for the use of fasteners, pins, or tools for attaching the wheel lift subassemblies 30 to the door frame 14.

Figure 7:
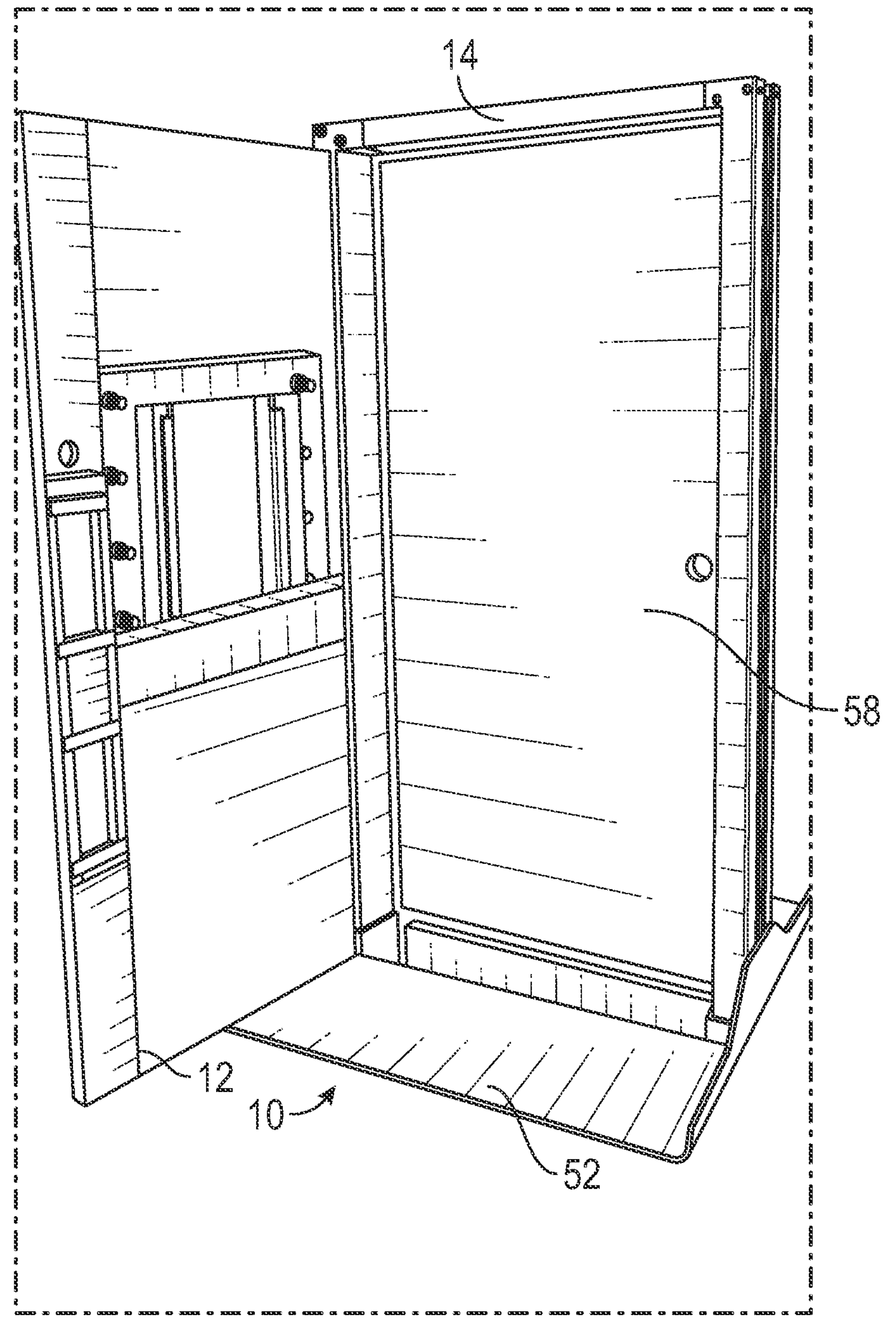
FIG. 7 is a front perspective view of a forcible entry training door assembly similar to the assembly of FIG. 1, according to an illustrative embodiment of the invention, wherein a primary door of the forcible entry training door assembly has been opened so as to reveal an auxiliary door disposed behind the primary door.
Figure 8:
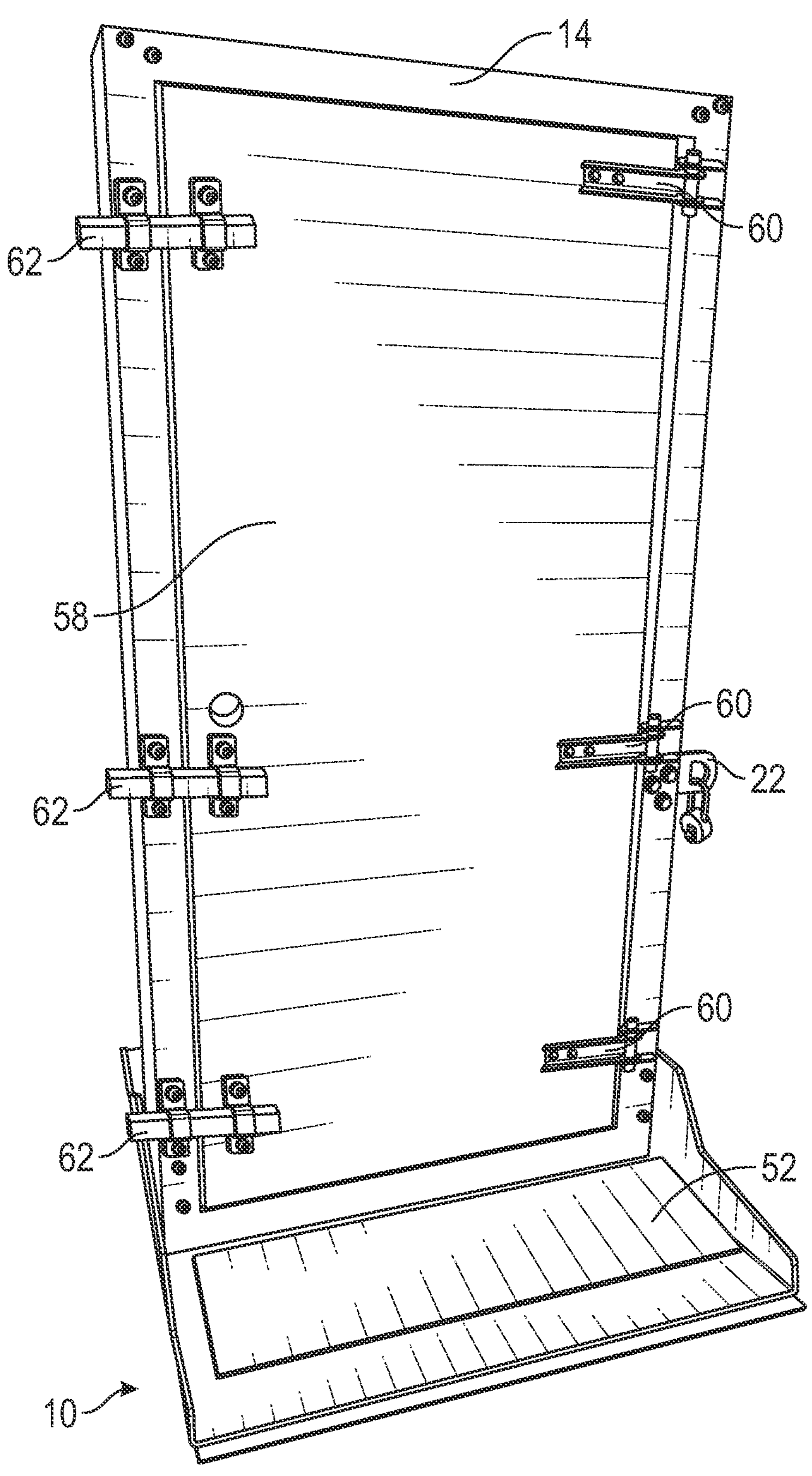
FIG. 8 is a rear perspective view of the forcible entry training door assembly of FIG. 7, wherein the hinges and the sacrificial securement blocks of the auxiliary door are shown.
Figure 9:
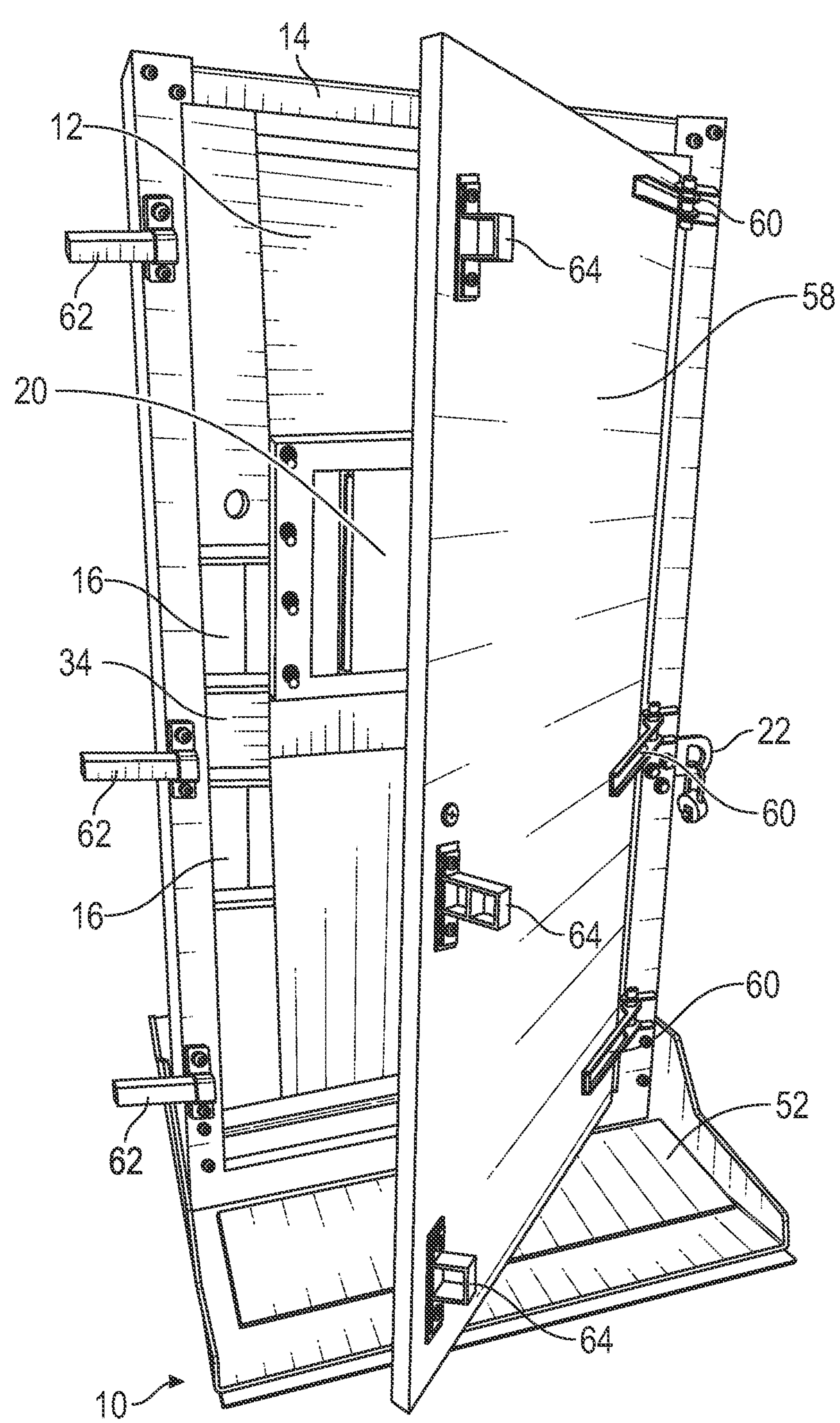
FIG. 9 is a rear perspective view of the forcible entry training door assembly of FIG. 7, wherein the auxiliary door of the forcible entry training door assembly has been opened so as to reveal additional features of the primary door and the auxiliary door.

In the illustrative embodiment, the door 12 with the plurality of pockets formed therein is a primary door, and the forcible entry training door assembly 10 further comprises an auxiliary door 58 mounted to the door frame 14 by means of auxiliary door hinges 60 (refer to FIGS. 7-9). As shown in FIG. 4, predetermined locations with slots 40 are provided along the length of the door frame 14 for mounting the auxiliary door hinges 60. The auxiliary door 58 (e.g., a scrap door) is configured to be used as a sacrificial door during one or more forcible entry training exercises so that the auxiliary sacrificial door 58 is able to be cut or otherwise damaged without damaging the primary door 12 of the forcible entry training door assembly 10. In addition, as shown in FIGS. 8 and 9, similar to the primary door 12 described above, the auxiliary sacrificial door 58 may be secured in a closed position by a plurality of sacrificial securement members 62 (e.g., formed from elongate wood blocks). The sacrificial securement members 62, which are inserted into the brackets 64 on the auxiliary door 58, are designed to be severed by the user during a forcible entry training exercise performed on the door 58. Advantageously, the forcible entry training door assembly 10 provides the ability to mount any size scrap door onto either side of the door assembly 10. This flexibility maximizes the use of old scrap doors making the door assembly 10 extremely versatile for both left and right swinging tactics.

In some embodiments, empty frame hinges 60 may be mounted at the predetermined locations on the door frame 14 with the slots 40 so as to allow for other types of auxiliary doors (e.g., different types of scrap doors) to be mounted onto the door frame 14 along with the primary training door 12. These frame hinges 60 may be adjustable to allow for virtually all sizes of doors to be mounted on the door frame 14.

Figure 11:
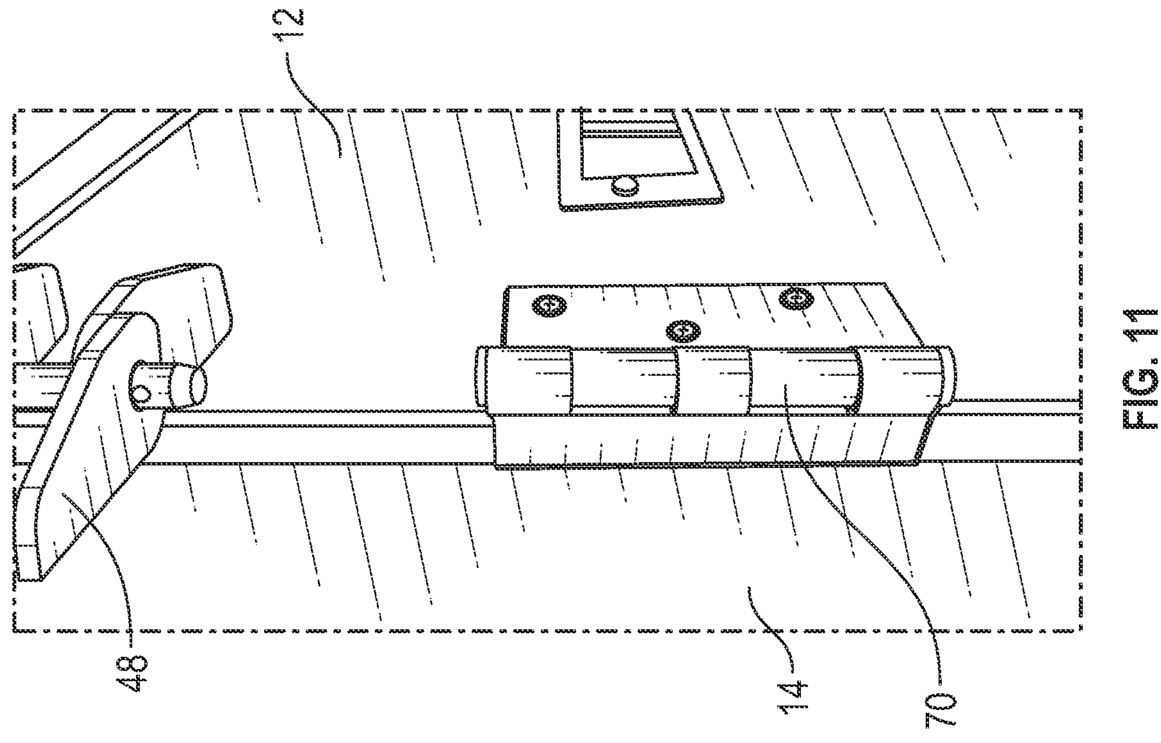
FIG. 11 is an enlarged front perspective view of the forcible entry training door assembly of FIG. 7, wherein a sacrificial door hinge mounted to the door frame is illustrated.
Figure 10:
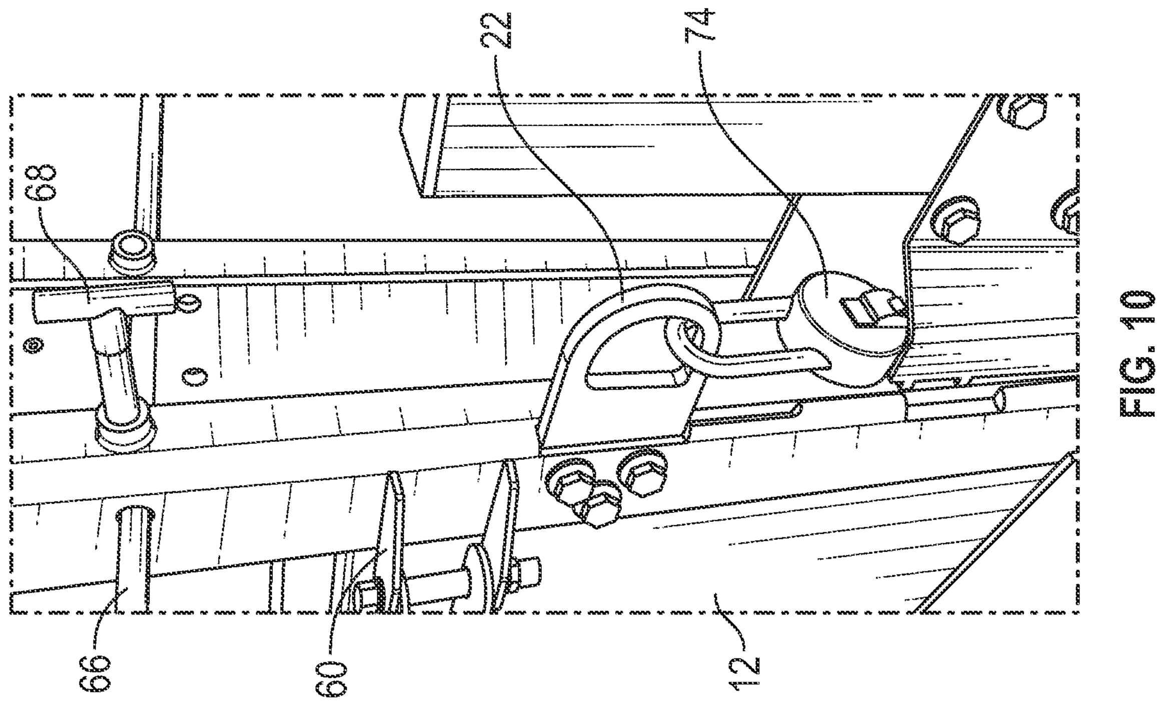
FIG. 10 is an enlarged side perspective view of the forcible entry training door assembly of FIG. 7, wherein a reinforcing bar support subassembly and an anchor bracket of the door frame are illustrated.
Figure 18:
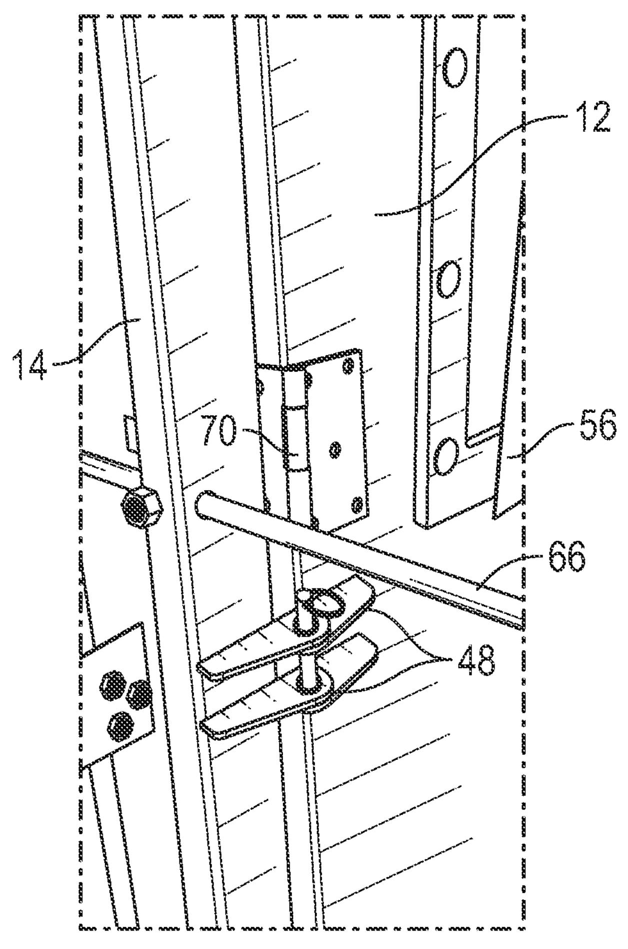
FIG. 18 is another enlarged side perspective view of the forcible entry training door assembly of FIG. 7, wherein a sacrificial door hinge mounted to the door frame is illustrated together with a reinforcing bar support subassembly and one of the primary door hinges.

Also, as shown in FIGS. 11 and 18, in the illustrative embodiment, the forcible entry training door assembly 10 further comprises a plurality of auxiliary door hinges 70 mounted to the door frame 14. The plurality of auxiliary door hinges 70 are configured to be used for teaching hinge prying techniques during one or more forcible entry training exercises so as to avoid damaging the primary door hinges 48 of the forcible entry training door assembly. Advantageously, the illustrative forcible entry training door assembly 10 provides actual hinge pulling/cutting by using real hinge screws in the exact anatomically correct placement of low, middle, and high points between the actual door and jamb, and not on a separate prop or off to the side (which is not realistic). In addition to the pry-off auxiliary door hinges 70, brackets may also be used for teaching prying techniques.

In addition, referring again to FIG. 4 of the illustrative embodiment, the forcible entry training door assembly 10 further comprises hinge holes 38 to allow for mounting door hinges (e.g., 4.5" commercial door hinges) in standard low, middle, and high areas that are commonly found on doors for hinge pulling/cutting training exercises. As one example, the user may slide the hinge between the door and jamb, and then push screws through the frame and door holes to mount the plurality of hinges. The hinges mounted in the hinge holes 38 do not hold the actual training door onto the door frame 14. Rather, these hinges are sacrificial, and can be pried or cut.

It is readily apparent that the aforedescribed forcible entry training door assembly 10 offers numerous advantages. First, the forcible entry training door assembly 10 provides sacrificial crush zones and a reusable door that is able to flex, rather than permanently deform. Secondly, the forcible entry training door assembly 10 offers many different options to the end user so as to be readily adaptable for use in a myriad of different training exercises. Finally, the forcible entry training door assembly 10 is readily portable so as to allow the door assembly 10 to be easily transported from one location to another location. Advantageously, the forcible entry training door assembly 10 provides many advanced features that are engineered and built into the door assembly 10 without the need for multiple standalone props. For example, the forcible entry training door assembly 10 has advanced heavy locking capabilities that provide the opportunity to train multiple advanced leverage tactics. Advantageously, a user is able to "shock, gap, set and force" the door 12 of the forcible entry training door assembly 10 anywhere from top to bottom on the realistic full height/full jamb stop door 12.

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A forcible entry training door assembly, comprising:

at least one sacrificial crush block;

at least one steel sleeve configured to receive the at least one sacrificial crush block;

a door frame; and a door pivotally coupled to the door frame, the door comprising a continuous door body portion that includes a continuous front surface, a continuous rear surface oppositely disposed relative to the continuous front surface, a plurality of pockets formed in the continuous door body portion for removably receiving respective sacrificial crush blocks alone and in the at least one steel sleeve, each of the sacrificial crush blocks and the at least one steel sleeve configured to be crushed by a user during a forcible entry training exercise and subsequently replaced with undeformed sacrificial crush blocks and/or steel sleeves for use during a subsequent forcible entry training exercise, the continuous front and rear surfaces of the continuous door body portion extending from a bottom edge of the continuous door body portion to the top edge of the continuous door body portion, and the continuous front and rear surfaces of the continuous door body portion extending from a first side edge of the continuous door body portion to a second, oppositely disposed side edge of the continuous door body portion;

wherein at least one of the plurality of pockets is formed by a notch in the second side edge of the continuous door body portion, the notch extending through the continuous door body portion from the continuous front surface of the continuous door body portion to the continuous rear surface of the continuous door body portion, the at least one of the plurality of pockets further formed by a first sidewall portion attached to the continuous front surface and a second sidewall portion attached to the continuous rear surface to form a bottom ledge, three side walls, and a top surface for directly supporting the at least one sacrificial crush block both with and without the steel sleeve in the at least one of the plurality of pockets such that the position of a portion of the at least one sacrificial crush block with and without the steel sleeve remains fixed relative to the door when crushed by a user during a forcible entry training exercise, and the at least one of the plurality of pockets being disposed below a securement member of the door or above the securement member of the door such that the at least one of the plurality of pockets is vertically spaced apart from any securement member of the door.

2. The forcible entry training door assembly according to claim 1, wherein the plurality of pockets for removably receiving the respective sacrificial crush blocks comprise a lower pocket below the securement member of the door for receiving a lower sacrificial crush block, and an upper pocket above the securement member of the door for receiving an upper sacrificial crush block;

wherein a top edge of the lower pocket is spaced apart from the securement member of the door by a first gap, and a bottom edge of the upper pocket is spaced apart from the securement member of the door by a second gap.

3. The forcible entry training door assembly according to claim 1, wherein the door is formed from a material that is configured to flex and bend to simulate a deformation of an actual door while a forcible entry training exercise is being performed on the door.

4. The forcible entry training door assembly according to claim 3, wherein the material forming the door comprises steel.

5. The forcible entry training door assembly according to claim 1, wherein the door frame comprises a plurality of modular elements that are bolted together so as to form the overall door frame, thereby enabling portions of the door frame to be repaired if damaged during a forcible entry training exercise.

6. The forcible entry training door assembly according to claim 1, wherein the door further comprises at least one centrally located cutout for accommodating a mounting of a sacrificial plate adjacent to the at least one centrally located cutout, the at least one centrally located cutout enabling the sacrificial plate to be cut during a forcible entry training exercise without damaging the door.

7. The forcible entry training door assembly according to claim 1, further comprising a drop bar subassembly mounted on an inswing side of the door, the drop bar subassembly enabling the user to simulate a forcible entry through an inswing door secured by a drop bar mounted across the inswing door.

8. The forcible entry training door assembly according to claim 1, further comprising a panic bar subassembly mounted to a central region of the door, the panic bar subassembly enabling the user to simulate a forcible entry through an actual door secured by a panic bar, and the panic bar subassembly being magnetically attached to the central region of the door so that the panic bar subassembly is able to be selectively attached and detached from the door during particular forcible entry training exercises without the use of tools.

9. The forcible entry training door assembly according to claim 1, further comprising at least one wheel lift subassembly that includes a bracket member, a trailer jack, and a plurality of wheels, the at least one wheel lift subassembly removably attached to the door frame by the bracket member, the at least one wheel lift subassembly configured to facilitate a transporting of the forcible entry training door assembly by enabling the forcible entry training door assembly to be rolled from one location to another location by using the plurality of wheels, and the trailer jack of the at least one wheel lift subassembly enabling the plurality of wheels to be elevated above a support surface so that the forcible entry training door assembly is able to be immovably supported on the support surface while a forcible entry training exercise is being performed by the user.

10. The forcible entry training door assembly according to claim 9, wherein the bracket member of the at least one wheel lift subassembly is configured to be removably attached to the door frame without the use of pins or tools.

11. The forcible entry training door assembly according to claim 1, wherein the door frame comprises at least one reinforcing bar support subassembly, the at least one reinforcing bar support subassembly comprising an aperture disposed through the door frame for receiving a piece of reinforcing bar, and the at least one reinforcing bar support subassembly further comprising a fastener member for securing the piece of reinforcing bar within the aperture while the piece of reinforcing bar is being cut by the user during a forcible entry training exercise.

12. The forcible entry training door assembly according to claim 1, wherein the door with the plurality of pockets formed therein is a primary door; and wherein the forcible entry training door assembly further comprises a plurality of auxiliary door hinges or brackets mounted to the door frame, the plurality of auxiliary door hinges or brackets configured to be used for attaching an auxiliary sacrificial door to the forcible entry training door assembly so that the auxiliary sacrificial door is able to be cut or otherwise damaged during one or more forcible entry training exercises without damaging the primary door of the forcible entry training door assembly.

13. The forcible entry training door assembly according to claim 1, wherein the door further comprises at least one door lock aperture disposed through the door for accommodating a mounting of a deadbolt lock on the door so that the deadbolt lock is able to be breached during a forcible entry training exercise.

14. The forcible entry training door assembly according to claim 1, wherein the door frame comprises at least one pocket formed therein for removably receiving a sacrificial frame crush block, the sacrificial frame crush block configured to be crushed by the user during a baseball swing forcible entry training exercise and subsequently replaced with an undeformed sacrificial frame crush block.

15. The forcible entry training door assembly according to claim 1, further comprising an anchor bracket mounted on a side of the door frame, the anchor bracket configured to accommodate a mounting of a padlock and/or a chain on the door frame so that padlock and/or chain breaching is able to be practiced by the user during a forcible entry training exercise.

16. The forcible entry training door assembly according to claim 1, further comprising a lock holder bracket mounted on a side of the door frame, the lock holder bracket configured to accommodate a mounting of a residential deadbolt lock or a commercial lock on the door frame so that a breaching of the residential deadbolt lock or the commercial lock is able to be practiced by the user during a forcible entry training exercise.

17. The forcible entry training door assembly according to claim 1, wherein the door further comprises at least one centrally located reinforced area for accommodating a ramming of the door by a battering ram swung by the user during a forcible entry training exercise.

18. The forcible entry training door assembly according to claim 1, wherein the door with the plurality of pockets formed therein is a primary door; and wherein the forcible entry training door assembly further comprises an auxiliary door mounted to the door frame by means of auxiliary door hinges, the auxiliary door configured to be used as a sacrificial door during one or more forcible entry training exercises so that the auxiliary sacrificial door is able to be cut or otherwise damaged without damaging the primary door of the forcible entry training door assembly.

* * * * *